United States Patent
Ellegaard (10) Patent No.: US 12,501,314 B2
(45) Date of Patent: Dec. 16, 2025

(54) AGGREGATION OF DATA FOR FRAMES OR DISAGGREGATION OF DATA FROM FRAMES

(71) Applicant: Microchip Technology Incorporated, Chandler, AZ (US)

(72) Inventor: Lars Ellegaard, Copenhagen (DK)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/445,525

(22) Filed: Aug. 20, 2021

(65) Prior Publication Data

US 2022/0078668 A1   Mar. 10, 2022

Related U.S. Application Data (60) Provisional application No. 62/706,792, filed on Sep. 10, 2020.

(51) Int. Cl.
    *H04W 28/06*    (2009.01)
    *H04W 28/02*    (2009.01)
    (Continued)

(52) U.S. Cl.
    CPC ..... *H04W 28/065* (2013.01); *H04W 28/0247* (2013.01); *H04W 72/53* (2023.01); *H04W 72/56* (2023.01)

(58) Field of Classification Search
    CPC ............. H04W 72/0493; H04W 72/10; H04W 28/0247; H04W 28/065; H04W 88/16; H04W 4/38; H04L 67/12; H04L 47/41
    See application file for complete search history.

(56) References Cited

U.S. PATENT DOCUMENTS

| | | | |
|---|---|---|---|
| 6,430,201 B1 * | 8/2002 | Azizoglu .............. | H04J 14/025 370/535 |
| 6,614,808 B1 * | 9/2003 | Gopalakrishna ...... | H04L 69/161 370/469 |

(Continued)

FOREIGN PATENT DOCUMENTS

| | | | | |
|---|---|---|---|---|
| CN | 110839213 A | * | 2/2020 | .......... H04W 74/085 |
| CN | 110944337 A | * | 3/2020 | ............ H04W 28/16 |

(Continued)

OTHER PUBLICATIONS

International Search Report from International Application No. PCT/US2021/071237, mailed Dec. 7, 2021, 4 pages.

(Continued)

*Primary Examiner* — Mehmood B. Khan
(74) *Attorney, Agent, or Firm* — TraskBritt (57) ABSTRACT

At least one example of the present disclosure includes an apparatus including a network-facing interface, multiple device-facing interfaces, and an aggregator/disaggregator. The aggregator/disaggregator may be arranged between the network-facing interface and the multiple device-facing interfaces. The aggregator/disaggregator may be configured to generate a plurality of control frames responsive to a received control frame. A respective one of the plurality of generated control frames may include an address of a respective one of multiple devices and a datum processed from data of the received control frame. Additionally or alternatively, the aggregator/disaggregator may be configured to generate a data frame responsive to a plurality of data frames received from the multiple devices. The generated data frame may include sense data comprising a respective sense datum processed from each of the plurality of received data frames. Related devices, systems and methods are disclosed.

19 Claims, 9 Drawing Sheets

(51) Int. Cl.
*H04W 72/53* (2023.01)
*H04W 72/56* (2023.01)

(56) References Cited

U.S. PATENT DOCUMENTS

| | | | | |
|---|---|---|---|---|
| 9,037,730 | B2* | 5/2015 | Sanchez Herrero | H04W 8/04 709/227 |
| 9,973,314 | B2* | 5/2018 | Wentink | H04L 5/005 |
| 11,190,628 | B2* | 11/2021 | Wang | H04L 67/566 |
| 2010/0103947 | A1* | 4/2010 | Anschutz | H04L 12/2892 370/420 |
| 2013/0094447 | A1* | 4/2013 | Gidlund | H04L 69/22 370/328 |
| 2016/0021627 | A1* | 1/2016 | Etkin | H04J 3/0658 370/312 |
| 2017/0328997 | A1* | 11/2017 | Silverstein | H04B 1/3827 |
| 2019/0264942 | A1* | 8/2019 | Cheng | F24F 11/56 |
| 2019/0268892 | A1* | 8/2019 | Gidvani | H04B 7/0413 |
| 2020/0359895 | A1* | 11/2020 | Hirst | H04L 12/40143 |
| 2021/0007168 | A1* | 1/2021 | Asterjadhi | H04W 52/0235 |
| 2021/0258660 | A1* | 8/2021 | Stamatakis | G06F 3/0482 |
| 2022/0128982 | A1* | 4/2022 | Mansfield | H04L 67/10 |
| 2023/0083724 | A1* | 3/2023 | Cella | G06Q 30/0206 705/28 |
| 2023/0084106 | A1* | 3/2023 | Sobol | G07C 9/29 340/5.61 |

FOREIGN PATENT DOCUMENTS

| | | | | |
|---|---|---|---|---|
| EP | 3563551 B1 * | 8/2022 | | H04W 52/0229 |
| WO | WO-2005033960 A1 * | 4/2005 | | H04L 9/40 |
| WO | WO-2011101032 A1 * | 8/2011 | | H04L 67/12 |
| WO | WO-2014014792 A1 * | 1/2014 | | H02J 13/00004 |
| WO | WO-2016171618 A1 * | 10/2016 | | H04L 9/3273 |

OTHER PUBLICATIONS

International Written Opinion from International Application No. PCT/US2021/071237, mailed Dec. 7, 2021, 7 pages.

* cited by examiner

AGGREGATION OF DATA FOR FRAMES OR DISAGGREGATION OF DATA FROM FRAMES

CROSS-REFERENCE TO RELATED APPLICATION

This application claims the benefit under 35 U.S.C. § 119(e) of U.S. Provisional Patent Application Ser. No. 62/706,792, filed Sep. 10, 2020, the disclosure of which is hereby incorporated herein in its entirety by this reference.

TECHNICAL FIELD

The present disclosure relates, generally, to aggregation of data for frames or disaggregation of data from frames, without limitation, related devices, systems and methods are disclosed.

BACKGROUND

Various interface standards for connecting computers and external peripherals may be used to provide connectivity at high speeds. A widely used, flexible networking standard for connecting computers (e.g., in Local Area Networks (LANs) and Wide Area Networks (WANs), without limitation) is the Ethernet protocol. Ethernet communication generally refers to point-to-point communication within a network of multiple end points. Ethernet protocols generally makes efficient use of shared resources, are easy to maintain and reconfigure, and are compatible across many systems.

BRIEF DESCRIPTION OF THE SEVERAL VIEWS OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a processor such as a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform one or more of the features or functions of examples described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code, without limitation) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Automation/control systems (e.g., industrial control systems, without limitation) are employed for controlling operation of, for example, processes or machines, and are typically adaptable to different control applications through configuration and interconnection of multiple control system components or devices (e.g., control modules, input/output (I/O) modules, I/O devices, without limitation). Some control systems may include a processor running or executing a control program to interact with an I/O system (e.g., typically one or more I/O modules or devices, without limitation) to receive system information in the form of analog or digital inputs from field sensors and to provide outputs (analog or digital) to one or more actuators. Control systems may be interconnected with management information and other systems in a manufacturing facility, and may be operatively connected to any number of communication networks to facilitate various management functions (e.g., inventory control, accounting, and manufacturing control, without limitation) in addition to process/machine control functionality.

A desire to integrate business and control network structures to interconnect control systems with general purpose systems, along with the evolution and development of Ethernet (e.g., in switch mode with full duplex capability, without limitation), has allowed for Ethernet networks (e.g., such as Ethernet/Internet Protocol (IP) networks that allow for direct connection of field devices to an Ethernet network, without limitation) to be widely used in various applications (e.g., industrial applications, without limitation).

In some cases, a control system may be configured to manage a number of different devices (e.g., I/O devices, without limitation) through an Ethernet network. If the number of different devices is large, controlling all the devices through the Ethernet network may be burdensome on the control system. For example, the control system may be required to establish and maintain an Ethernet session with each device individually. Additionally, some devices may send a full Ethernet frame to communicate a relatively simple message. In some cases, the header of the Ethernet frame may be longer than the data contained in the Ethernet frame.

Some examples of the present disclosure may be configured to alleviate these and other concerns of using an Ethernet network to connect a control system with multiple devices.

Some examples of the present disclosure include an aggregator that may be configured to receive Ethernet frames from a number of different devices, extract data from the received Ethernet frames, reframe the extracted data in a new Ethernet frame, and transmit the new Ethernet frame to the control system. Additionally or alternatively, the aggregator may be configured to receive a single Ethernet frame from the control system, extract data for individual devices from the received single Ethernet frame, reframe the extracted data into a number of Ethernet frames (e.g., one for each of the individual devices, without limitation), and transmit the number of Ethernet frames to the individual devices.

By aggregating data from communications (e.g., Ethernet frames, without limitation) from the devices to the control system and data from communications from the control system to the devices, the aggregator may alleviate the burden on the control system of managing communication with each of the devices individually. By alleviating a burden on the control system the aggregator may enable the control system to perform other functions more effectively (e.g., by using computing resources for other tasks instead of Ethernet session management or frame generation, without limitation). Additionally or alternatively, by aggregating communication, the aggregator may decrease network traffic on a network connecting the control system to the devices.

Figure 1:
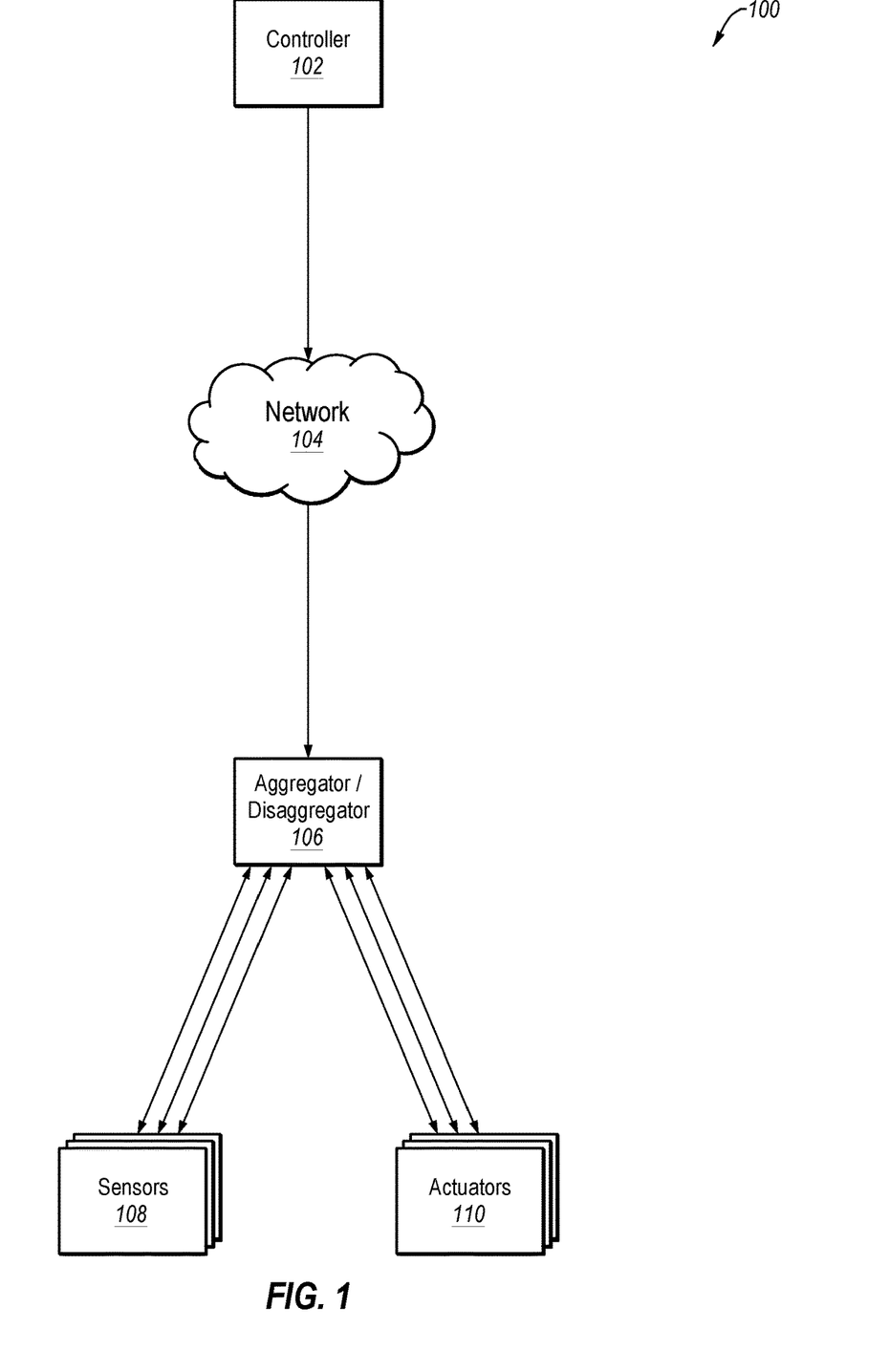
FIG. 1 is a functional block diagram illustrating an example system according to one or more examples of the present disclosure.

FIG. 1 is a functional block diagram illustrating an example system 100 according to one or more examples of the present disclosure. System 100 is depicted including controller 102 (which is an example of a control system), network 104, aggregator/disaggregator 106, sensors 108, and actuators 110, which sensors 108 and actuators 110 are examples of devices.

Controller 102 may be, or include a device, to send data, (e.g., control data, e.g., instructions, without limitation) to one or more actuators 110 and receive data (e.g., sense data, without limitation) from one or more sensors 108. In some examples, controller 102 may be or may include a programmable logic controller (PLC). In these or other examples, controller 102 may be or may include a processor. Controller 102 may control operations of a network, or system, of devices (including e.g., sensors 108 or actuators 110, without limitation) to perform coordinated operations (e.g., manufacturing or processing operations, without limitation).

Controller 102 may be communicatively connected to sensors 108 and actuators 110 via network 104. Network 104 may be, or may include, a communication network through which controller 102 can send data to actuators 110 and receive data from sensors 108. Network 104 may include one or more switches, bridges, and network cables and the like. Network 104 may function according to Ethernet protocols, in other words, network 104 may be an Ethernet network.

Sensors 108 may, generally, sense one or more properties. Non-limiting examples of sensors includes: acoustic sensors, chemical sensors, electric sensors, magnetic sensors, radiation sensors, fluid sensors, position sensors, displacement sensors, speed sensors, optical sensors, pressure sensors, force sensors, weight sensors, thermal sensors, and combinations thereof. Sensors 108 may sense one or more properties (alternatively referred to herein as "take a reading") and to provide data indicative of the sensed properties (alternatively referred to herein as "to provide the reading").

Actuators 110 may directly, or indirectly, move, electrically connect, or control a mechanism or system in response to a control signal. Actuators 110 may optionally include sensors to measure the movement e.g., for a control loop, without limitation. Non-limiting examples of actuators 110 includes: hydraulic actuators, pneumatic actuators, electric actuators, thermal actuators, magnetic actuators, motors or mechanical actuators. Actuators 110 may move or cause movement based on data (e.g., an instruction, without limitation). For example, instructions to actuators 110 may include instructions regarding how much to move, how fast to move, or how much force or current to apply.

Figure 2:
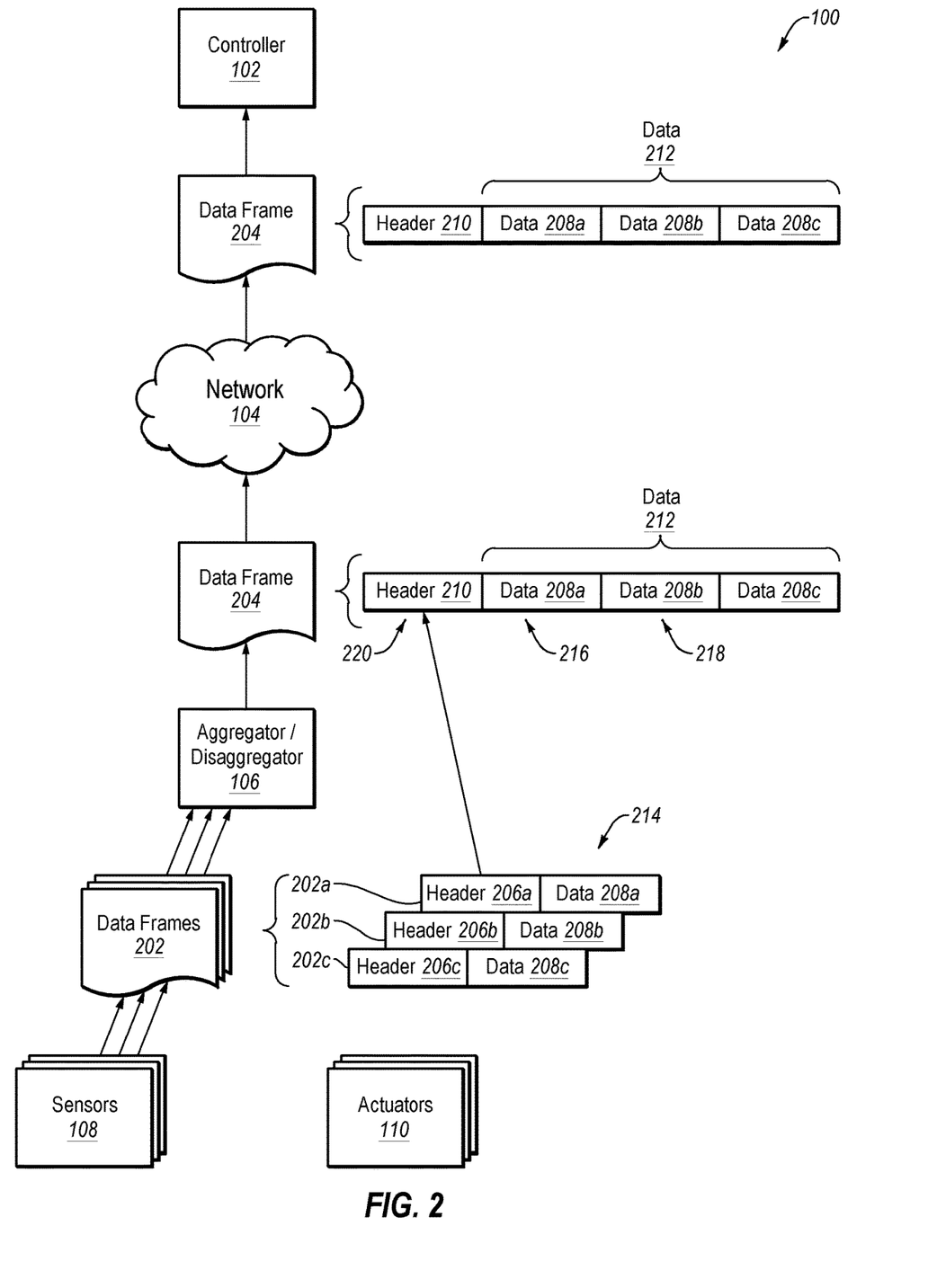
FIG. 2 is a functional block diagram illustrating an example operation of the system of FIG. 1 according to one or more examples of the present disclosure.
Figure 3:
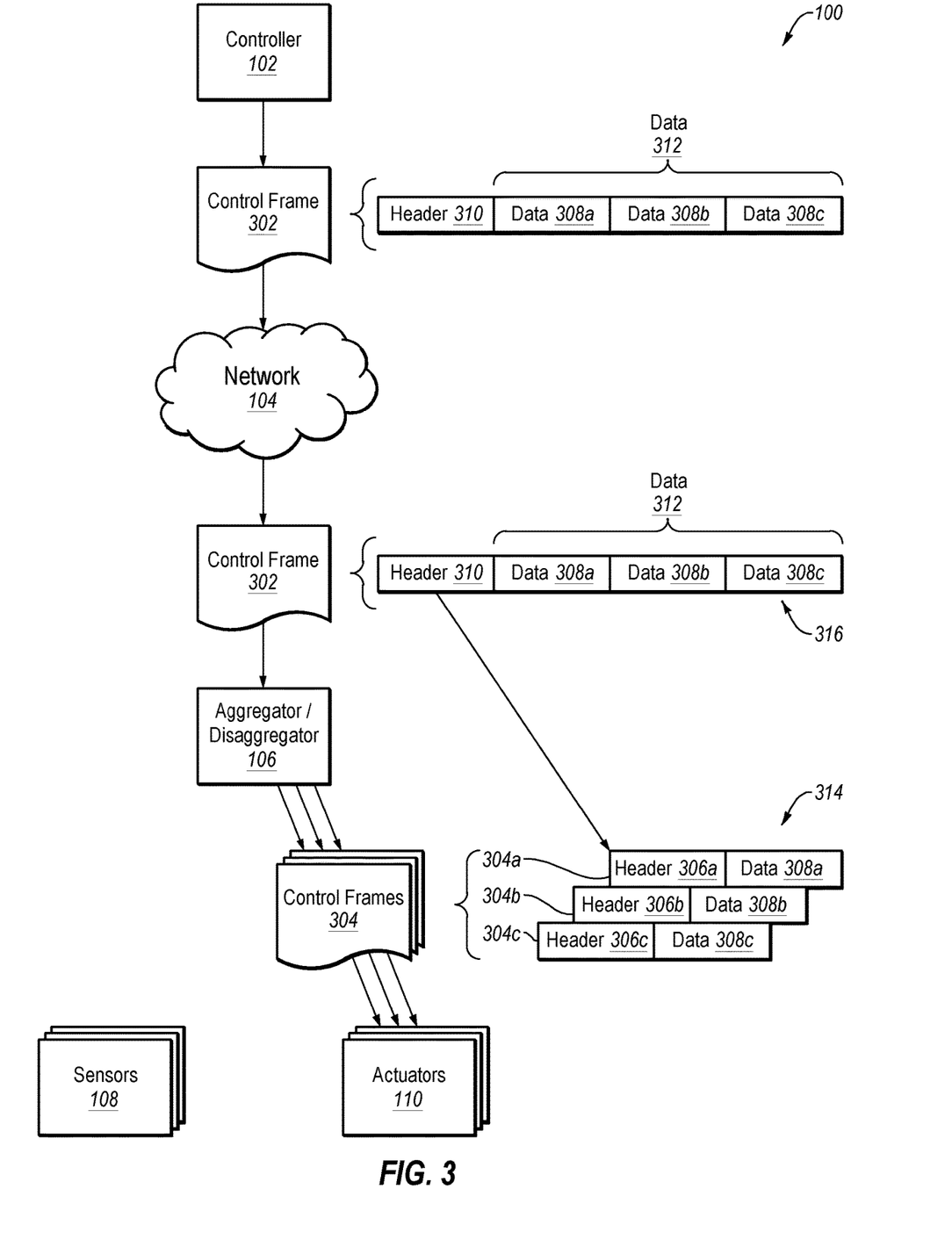
FIG. 3 is a functional block diagram illustrating another example operation of the system of FIG. 1 according to one or more examples of the present disclosure.

In some examples, aggregator/disaggregator 106 may one or both of aggregate or disaggregate data for communication between controller 102 and sensors 108 and actuators 110. FIG. 2 illustrates an example operation in which aggregator/disaggregator 106 aggregates data for communication from sensors 108 to controller 102 and FIG. 3 illustrates an example operation in which aggregator/disaggregator 106 disaggregates data for communication from controller 102 to actuators 110.

Sensors 108 and actuators 110 are examples of devices with which controller 102 may communicate. Controller 102 may send data (e.g., control data, e.g., instructions, without limitation) to actuators 110 and sensors 108 may send data (e.g., sense data, without limitation) to controller 102. Additionally, other devices are possible and are within the scope of this disclosure. For example, a single device may receive data (e.g., control data, without limitation) and to send data (e.g., sense data, without limitation).

FIG. 2 is a functional block diagram illustrating an example operation of the system 100 of FIG. 1 according to one or more examples of the present disclosure. Specifically, FIG. 2 illustrates an example in which aggregator/disaggregator 106 aggregates data for communication from sensors 108 to controller 102. In FIG. 2, system 100 is depicted including controller 102, network 104, aggregator/disaggregator 106, sensors 108, and actuators 110. In FIG. 2, sensors 108 are depicted providing data frames 202 (including data frame 202a, which data frame 202a includes header 206a and data 208a, data frame 202b, which data frame 202b includes header 206b and data 208b, and data frame 202c, which data frame 202c includes header 206c and data 208c) to aggregator/disaggregator 106. As depicted in FIG. 2, data frames 202 may be Ethernet frames 214 e.g., for communication on an Ethernet network. In FIG. 2, aggregator/disaggregator 106 is depicted providing data frame 204 including header 210 and data 212 (which data 212 includes data 208a, data 208b, and data 208c) to controller 102 via network 104. As depicted in FIG. 2, data frame 204 may be Ethernet frame 216 e.g., for communication on an Ethernet network. As depicted in FIG. 2, data 208a, data 208b, and data 208c may be ordered in data 212 according to an order 218. As depicted in FIG. 2, header 210 may include information 220 about order 218.

Sensors 108 may include any number of sensors (e.g., a first sensor, a second sensor, and a third sensor, without limitation). Each of sensors 108 may take a reading and generate a data frame (e.g., the first sensor may generate data frame 202a including header 206a and data 208a, the second sensor may generate data frame 202b including header 206b and data 208b, and the third sensor may generate data frame 202c including header 206c and data 208c, without limitation) indicative of the respective reading. To not burden controller 102 or network 104 with each of data frames 202 individually, aggregator/disaggregator 106 may aggregate data 208a, data 208b, and data 208c from data frame 202a, data frame 202b, and data frame 202c, respectively, to generate data frame 204. In other words, aggregator/disaggregator 106 may receive data frames 202, extract data (e.g., data 208a, data 208b, and data 208c, without limitation) from data frames 202, generate data frame 204, reframe the extracted data into data 212 of data frame 204, and transmit data frame 204 to controller 102 via network 104. In generating data frame 204, aggregator/disaggregator 106 may generate header 210 including relevant information such as an address of controller 102 or an address of aggregator/disaggregator 106.

Aggregator/disaggregator 106 may perform these or other operations according to a timing or at repeating intervals. For example, aggregator/disaggregator 106 may receive data frames 202 over a time duration. During or following the time duration, aggregator/disaggregator 106 may aggregate data (e.g., data 208a, data 208b, and data 208c, without limitation) from the data frames 202 received during the time duration and generate data frame 204 including the aggregated data 212. Aggregator/disaggregator 106 may include a timer (not illustrated in FIG. 2) to allow for aggregator/disaggregator 106 to operate according to the timing. Additionally, aggregator/disaggregator 106 may include a data storage (not illustrated in FIG. 2) to store data (e.g., data 208a, data 208b, data 208c, header 206a, header 206b, and header 206c without limitation) received in data frames 202 until or as the data is aggregated into data frame 204.

Aggregator/disaggregator 106 may process (e.g., collate) the data (e.g., data 208a, data 208b, and data 208c, without limitation) to generate data frame 204. For example, aggregator/disaggregator 106 may collect data 208a, data 208b, and data 208c from data frames 202. Further, in some examples, aggregator/disaggregator 106 may order data 208a, data 208b, and data 208c in data 212 of data frame 204 according to a pre-specified order (e.g., based on respective identities of the sensors 108 from which the data was received, without limitation). In such cases, order 218 may be the pre-specified order. Alternatively, in some examples, aggregator/disaggregator 106 may order data 208a, data 208b, and data 208c in data 212 of data frame 204 according to an order in which the data was received. In such cases, order 218 may be the order in which the data was received. In these or other examples, aggregator/disaggregator 106 may include information 220 about order 218 of the data (e.g., data 208a, data 208b, and data 208c, without limitation) in header 210 of the data frame 204 generated by aggregator/disaggregator 106.

Data frames 202 may be Ethernet frames 214 and data frame 204 may be Ethernet frame 216. Ethernet frames 214 and Ethernet frame 216 may be for communication on an Ethernet network.

FIG. 3 is a functional block diagram illustrating another example operation of the system 100 of FIG. 1 according to one or more examples of the present disclosure. Specifically, FIG. 3 illustrates an example in which aggregator/disaggregator 106 disaggregates data for communication from controller 102 to actuators 110. In FIG. 3, system 100 is depicted including controller 102, network 104, aggregator/disaggregator 106, sensors 108, and actuators 110. In FIG. 3, controller 102 is depicted providing control frame 302 including header 310 and data 312 (including data 308a, data 308b, and data 308c) to aggregator/disaggregator 106 via network 104. As depicted in FIG. 3, control frame 302 may be an Ethernet frame 316 e.g., for communication on an Ethernet network. In FIG. 3, aggregator/disaggregator 106 is depicted providing control frames 304 (including control frame 304a, control frame 304a including header 306a and data 308a, control frame 304b, control frame 304b including header 306b and data 308b, and control frame 304c, control frame 304c including header 306c and data 308c) to actuators 110. As depicted in FIG. 3, control frames 304 may be Ethernet frames 314 e.g., for communication on an Ethernet network.

Actuators 110 may include any number of actuators (e.g., a first actuator, a second actuator, and a third actuator, without limitation). Controller 102 may provide separate data (e.g., including instructions) for each of actuators 110 (e.g., data 308a for the first actuator, data 308b for the second actuator, and data 308c for the third actuator, without limitation). To not burden controller 102 with managing an Ethernet session with each of actuators 110, to not burden controller 102 with generating a full Ethernet frame for each of actuators 110, or to not burden network 104, controller 102 may generate a single data frame, e.g., control frame 302, including data 312, which data 312 includes data 308a, data 308b, and data 308c for each of the first actuator, the second actuator and the third actuator, respectively. This may work in system 100 because aggregator/disaggregator 106 may disaggregate the data 312 for each of actuators 110 from control frame 302. In other words, aggregator/disaggregator 106 may receive control frame 302 (which may include data 312 for actuators 110), extract the data 308a, data 308b, and data 308c, generate control frames 304, reframe data 308a, data 308b, and data 308c into control frames 304 (e.g., control frame 304a for the actuator, control frame 304b for the second actuator, and control frame 304c for the third actuator, without limitation), and provide each of the control frames 304 to a respective actuator of actuators 110.

Aggregator/disaggregator 106 may process (e.g., parse) data 312. For example, based on a pre-specified order, aggregator/disaggregator 106 may determine that a first number of bytes of data 312 are data 308a intended for the first actuator, that a second number of bytes of data 312 are data 308b intended for the second actuator, and that a third number of bytes of data 312 are data 308c intended for the third actuator. As another example, header 310 of control frame 302 may include information indicative of a size of data 308a, data 308b, or data 308c within data 312 and a respective destination of each of data 308a, data 308b, and data 308c.

Aggregator/disaggregator 106 may generate headers for each of the control frames 304 e.g., header 306a for the control frame 304a, header 306b for control frame 304b, and header 306c for control frame 304c. Information for each of the headers (e.g., header 306a, header 306b, and header 306c, without limitation) may be obtained from header 310 of control frame 302. Additionally or alternatively, some of the information for the headers (e.g., header 306a, header 306b, and header 306c, without limitation) may be based on an order of data 312 (e.g., an order of data 308a, data 308b, and data 308c in data 312, without limitation) in control frame 302.

Additionally, aggregator/disaggregator 106 may provide each of control frames 304 to an intended recipient of actuators 110. For example, aggregator/disaggregator 106 may include two or more interfaces each of which may be coupled to one of actuators 110. Aggregator/disaggregator 106 may determine a destination for each of control frames 304 (e.g., one of actuators 110, without limitation) and to provide each of control frames 304 at the appropriate interface. Aggregator/disaggregator 106 may determine the destination based on information in header 310 (e.g., address information and size information, without limitation) or based on a pre-specified order (e.g., an association between an order of data 308a, data 308b, and data 308c in data 312 and an intended recipient, without limitation).

Figure 4:
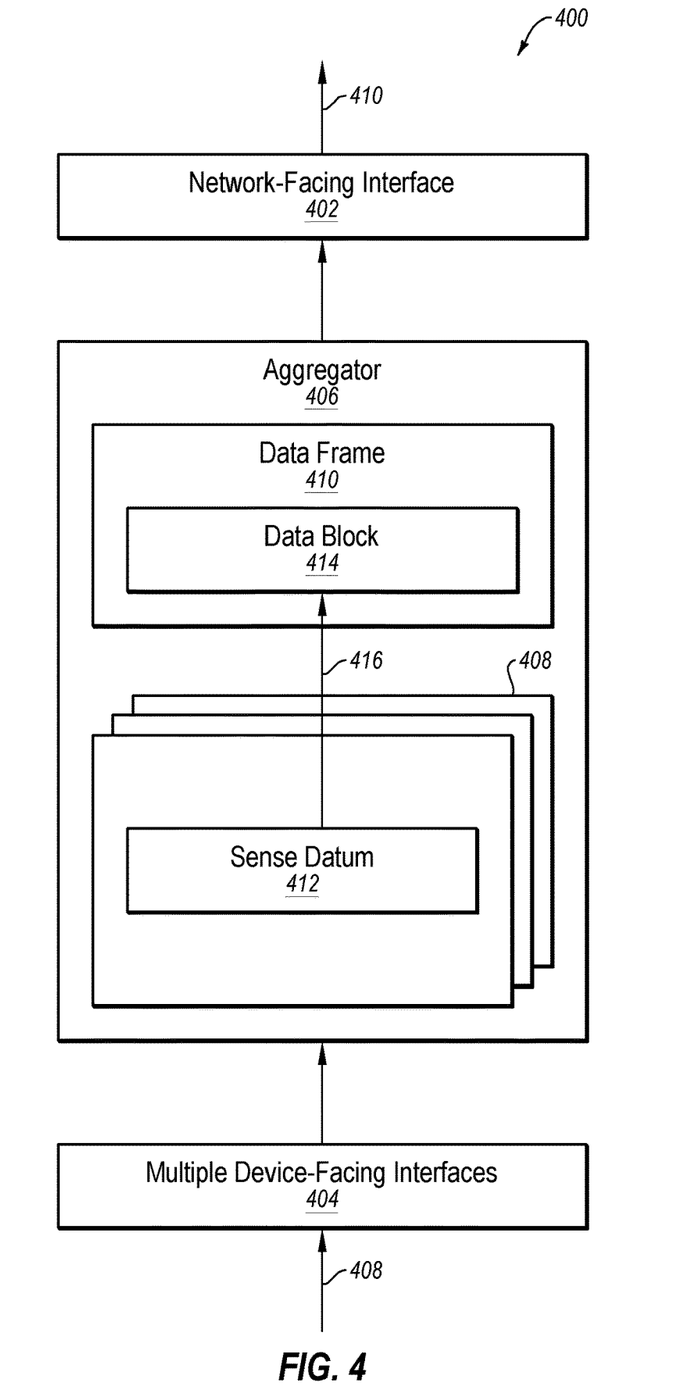
FIG. 4 is a functional block diagram illustrating an example apparatus according to one or more examples of the present disclosure.

FIG. 4 is a functional block diagram illustrating an example apparatus 400 according to one or more examples of the present disclosure. In FIG. 4, apparatus 400 is depicted including network-facing interface 402, multiple device-facing interfaces 404, and aggregator 406. In FIG. 4, aggregator 406 is depicted generating data frame 410 including data block 414 responsive to data frames 408, one of which data frames 408 includes sense datum 412. In FIG. 4, aggregator 406 is depicted processing 416 sense datum 412 to generate data block 414.

Network-facing interface 402 may provide data frame 410, e.g., to controller 102 of FIG. 1, FIG. 2, or FIG. 3, without limitation. Multiple device-facing interfaces 404 may each communicate with a respective device (e.g., sensors 108 or actuators 110 of FIG. 1, FIG. 2, or FIG. 3, without limitation) such that multiple device-facing interfaces 404 communicate with multiple devices. The devices with which multiple device-facing interfaces 404 are communicatively coupled may or may not be communicatively coupled to another device. In some instances, the only communication path between the network (or a controller) and the devices may be through apparatus 400. Hence, the devices may be referred to as "devices" or "edge devices" and multiple device-facing interfaces 404 may be referred to as "device-facing" or "edge-facing."

Aggregator 406 is arranged between network-facing interface 402 and multiple device-facing interfaces 404. Aggregator 406 generates data frame 410 responsive to a plurality of data frames 408 received from the multiple devices. Generated data frame 410 may include respective sense datum 412 processed (e.g., parsed) from each of the plurality of received data frames 408. Aggregator 406 may be a functional portion of aggregator/disaggregator 106.

Figure 5:
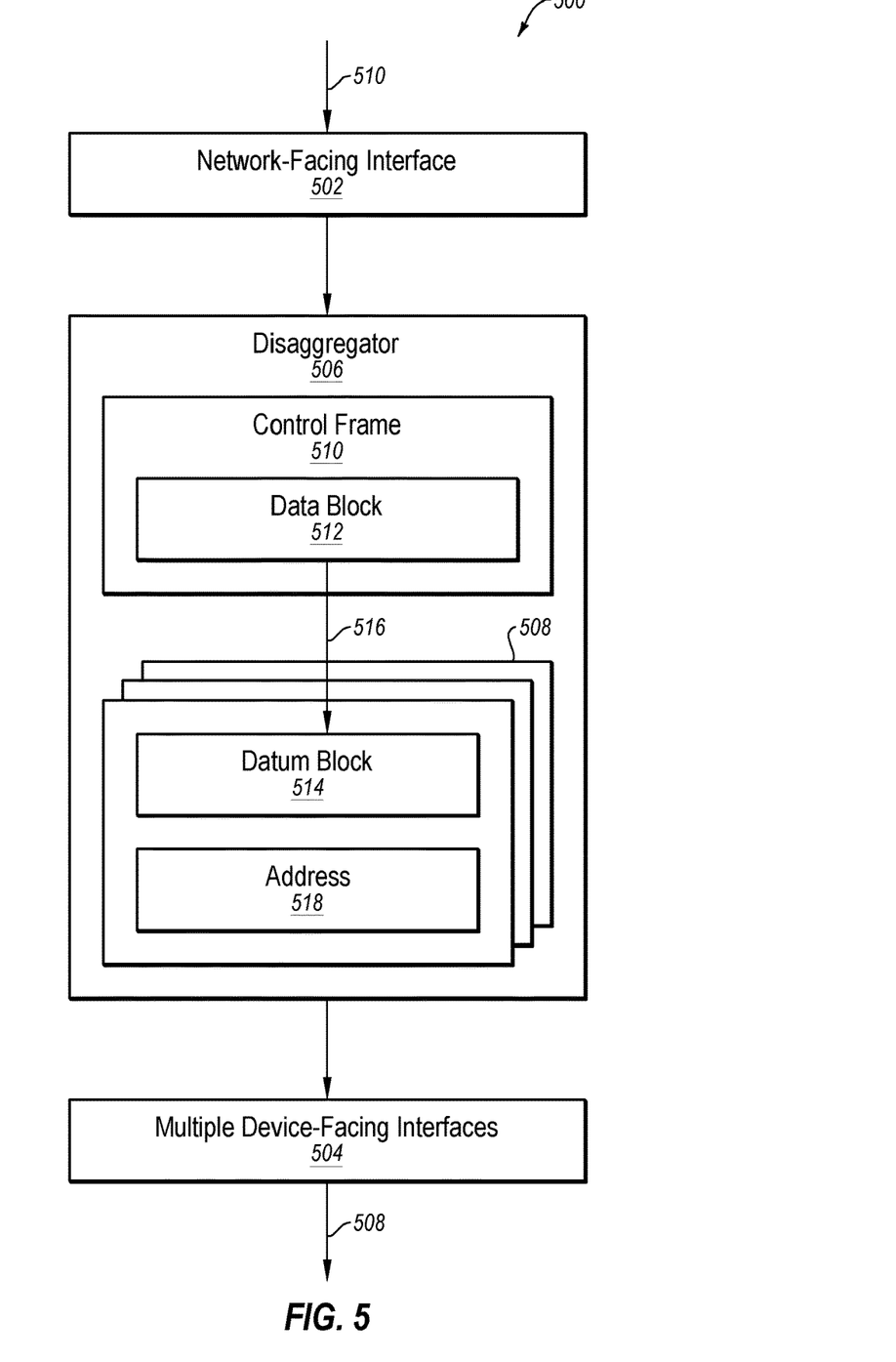
FIG. 5 is a functional block diagram illustrating another example apparatus according to one or more examples of the present disclosure.

FIG. 5 is a functional block diagram illustrating another example apparatus 500 according to one or more examples of the present disclosure. In FIG. 5, apparatus 500 is depicted including network-facing interface 502, multiple device-facing interfaces 504, and disaggregator 506. In FIG. 5, disaggregator 506 is depicted generating control frames 508, one of which control frames 508 includes datum block 514 and address 518, responsive to received control frame 510, which received control frame 510 includes data block 512. In FIG. 5, disaggregator 506 is depicted processing 516 data block 512 to generate datum block 514.

Network-facing interface 502 may receive control frame 510 (e.g., from a controller 102 of FIG. 1, FIG. 2, or FIG. 3, without limitation). Multiple device-facing interfaces 504 may each communicate with a respective device (e.g., sensors 108 or actuators 110 of FIG. 1, FIG. 2, or FIG. 3, without limitation) such that multiple device-facing interfaces 504 communicate with multiple devices. The devices with which multiple device-facing interfaces 504 are communicatively coupled may or may not be communicatively coupled to another device. In some instances, the only communication path between the network (or a controller) and the devices may be through apparatus 500. Hence, the devices may be referred to as "devices" or "edge devices" and multiple device-facing interfaces 504 may be referred to as "device-facing" or "edge-facing."

Disaggregator 506 is arranged between network-facing interface 502 and multiple device-facing interfaces 504. Disaggregator 506 may generate a plurality of control frames 508 responsive to received control frame 510. A respective one of the control frames 508 of plurality of generated control frames 508 may include address 518 of a respective one of the multiple devices and datum block 514 processed (e.g., collated) from data block 512 of the received control frame 510. Disaggregator 506 may be a functional portion of aggregator/disaggregator 106.

Figure 6:
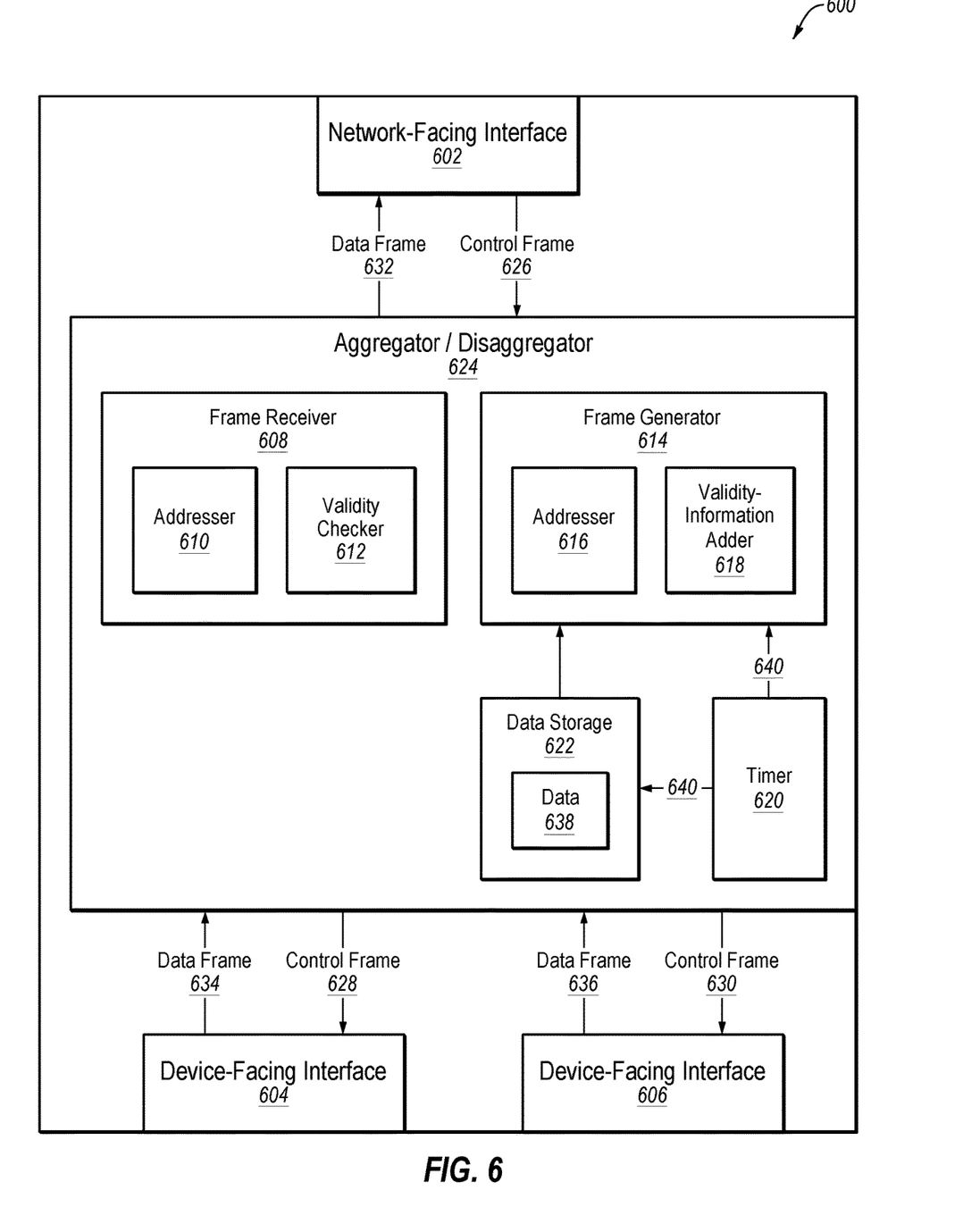
FIG. 6 is a functional block diagram illustrating an example switch according to one or more examples of the present disclosure.

FIG. 6 is a functional block diagram illustrating an example switch 600 according to one or more examples of the present disclosure. In FIG. 6, switch 600 is depicted including a network-facing interface 602, device-facing interface 604, device-facing interface 606, and aggregator/disaggregator 624. In FIG. 6, aggregator/disaggregator 624 is depicted including frame receiver 608, frame generator 614, timer 620, and data storage 622. In FIG. 6, frame receiver 608 is depicted including addresser 610 and validity checker 612. In FIG. 6, frame generator 614 is depicted including addresser 616 and validity-information adder 618. In FIG. 6, network-facing interface 602 is depicted providing control frame 626 to aggregator/disaggregator 624. In FIG. 6, device-facing interface 604 is depicted providing data frame 634 to aggregator/disaggregator 624. In FIG. 6, device-facing interface 606 is depicted providing data frame 636 to aggregator/disaggregator 624. In FIG. 6, aggregator/disaggregator 624 is depicted providing data frame 632 to network-facing interface 602, control frame 628 to device-facing interface 604, and control frame 630 to device-facing interface 606. In FIG. 6, data storage 622 is depicted storing data 638. In FIG. 6, timer 620 is depicted providing timing 640 to data storage 622 and to frame generator 614.

Switch 600 includes multiple ports including network-facing interface 602, device-facing interface 604, and device-facing interface 606. Each of network-facing interface 602, device-facing interface 604, and device-facing interface 606, may receive and transmit signals (e.g., Ethernet frames, without limitation). The number of ports was selected for illustrative purposes, and is not meant to be limiting in any way. A switch 600 according to the present disclosure may include any number of ports. Further, there may be no inherent difference between network-facing interface 602 and any of device-facing interface 604 and device-facing interface 606. The difference between network-facing interface 602 and device-facing interface 604 and device-facing interface 606 may be that network-facing interface 602 may be communicatively coupled to a network (e.g., network 104 of FIG. 1, FIG. 2, or FIG. 3, without limitation) while each of device-facing interface 604 and device-facing interface 606 may be communicatively coupled to a respective device (e.g., sensors 108 or actuators 110 of FIG. 1, FIG. 2, or FIG. 3, without limitation). The devices to which device-facing interface 604 and device-facing interface 606 are communicatively coupled may or may not be communicatively coupled to another device. In some instances, the only communication path between the network (or a controller) and the devices may be through switch 600. Hence, the devices may be referred to as "devices" or "edge devices" and device-facing interface 604 and device-facing interface 606 may be referred to as "device-facing" or "edge-facing."

Aggregator/disaggregator 624 may be an example of aggregator/disaggregator 106 of FIG. 1, FIG. 2, or FIG. 3, disaggregator 506 of FIG. 5, or aggregator 406 of FIG. 4.

Frame receiver 608 may process incoming frames. Processing incoming frames may include switching the incoming frames, e.g., by examining source and destination addresses, without limitation, e.g., at addresser 610, without limitation. Further, processing incoming frames may include checking validity or security of the incoming frames at a validity checker 612, which may, for example, check validity by generating a 32-bit cyclic redundancy check and comparing the 32-bit cyclic redundancy check with a received frame check sequence.

Frame generator 614 may generate outgoing frames. Generating outgoing frames may include generating a header including addresses and other information for the outgoing frames e.g., at addresser 616, without limitation. Further, generating outgoing frames may include generating additional information (e.g., for a header, without limitation) for security or validity checking at a receiver e.g., at validity-information adder 618, without limitation, which validity-information adder 618 may, for example, generate a frame check sequence and provide the frame check sequence to frame generator 614.

Timer 620 may be used to measure a time duration for receiving frames (e.g., at device-facing interface 604 and device-facing interface 606, without limitation) before output timing 640 to frame generator 614 and data storage 622 to parse data 638, which may be stored in data storage 622, from the received frames. Additionally, timer 620 may be used in timing transmission of frames at any or all of network-facing interface 602, device-facing interface 604, and device-facing interface 606. Timer may be or may include any suitable means of determining that a time duration has elapsed or of measuring time e.g., a clock.

Data storage 622 may be used in the generation of frames. Specifically, data 638 from received frames may be extracted into data storage 622 where data 638 may be stored while one or more frames including the data may be generated.

As an example of timer 620 and data storage 622 in operation, data from all frames received at device-facing interface 604 and device-facing interface 606 during a time duration (as measured by timer 620) may be stored in data storage 622 as data 638. After the time duration, responsive to timing 640 which may be a signal, data 638 from data storage 622 may be reframed into a new frame which may be generated, and transmitted at network-facing interface 602.

Figure 7:
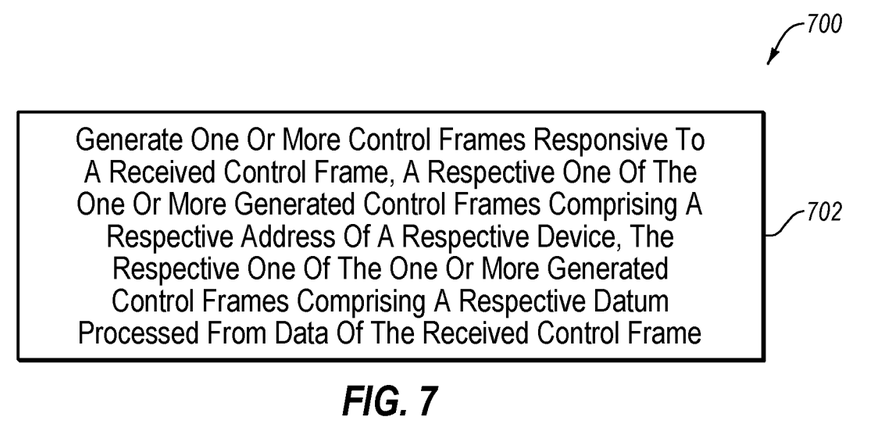
FIG. 7 is a flowchart of an example method according to one or more examples of the present disclosure.

FIG. 7 is a flowchart of an example method 700 according to one or more examples of the present disclosure. One or more of aggregator/disaggregator 106 of FIG. 1, FIG. 3, disaggregator 506 of FIG. 5, or aggregator/disaggregator 624 of FIG. 6, may perform one or more of the operations described herein with regard to method 700.

At operation 702, one or more control frames (e.g., control frames 304 of FIG. 3 or control frames 508 of FIG.

5, without limitation) may be generated responsive to a received control frame (e.g., control frame 302 of FIG. 3 or control frame 510 of FIG. 5, without limitation). A respective one of the one or more generated control frames may include a respective address (e.g., address 518 of FIG. 5, without limitation) of a respective device (e.g., sensors 108 or actuators 110 of FIG. 1 or FIG. 3, without limitation). The respective one of the one or more generated control frames may include a respective datum (e.g., data 308a of FIG. 3 or datum block 514 of FIG. 5, without limitation) processed from data of the received control frame.

Figure 8:
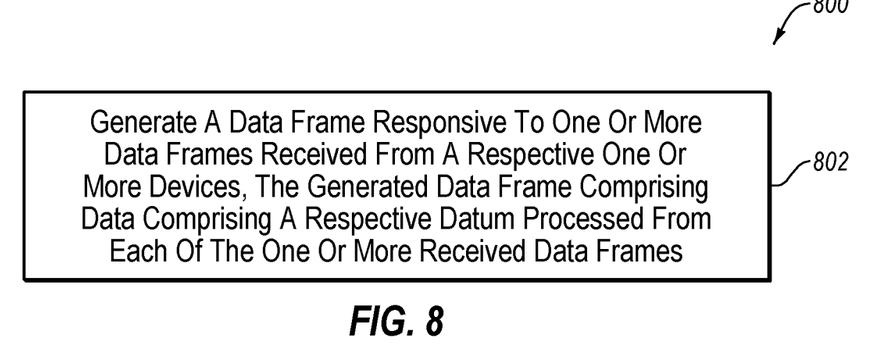
FIG. 8 is a flowchart of another example method according to one or more examples of the present disclosure.

FIG. 8 is a flowchart of another example method 800 according to one or more examples of the present disclosure. One or more of aggregator/disaggregator 106 of FIG. 1, FIG. 2, aggregator 406 of FIG. 4, or aggregator/disaggregator 624 of FIG. 6, may perform one or more of the operations described herein with regard to method 800.

At operation 802, a data frame (e.g., data frame 204 of FIG. 2 or data frame 410 of FIG. 4, without limitation) may be generated responsive to one or more data frames (e.g., 202 of FIG. 2 or data frames 408 of FIG. 4, without limitation) received from a respective one or more devices (e.g., sensors 108 or actuators 110 of FIG. 1 or FIG. 2, without limitation). The generated data frame may include data (e.g., data 212 of FIG. 2 or data block 414 of FIG. 4, without limitation) comprising a respective datum (e.g., data 208a of FIG. 2 or sense datum 412 of FIG. 4, without limitation) processed from each of the one or more received data frames.

Figure 9:
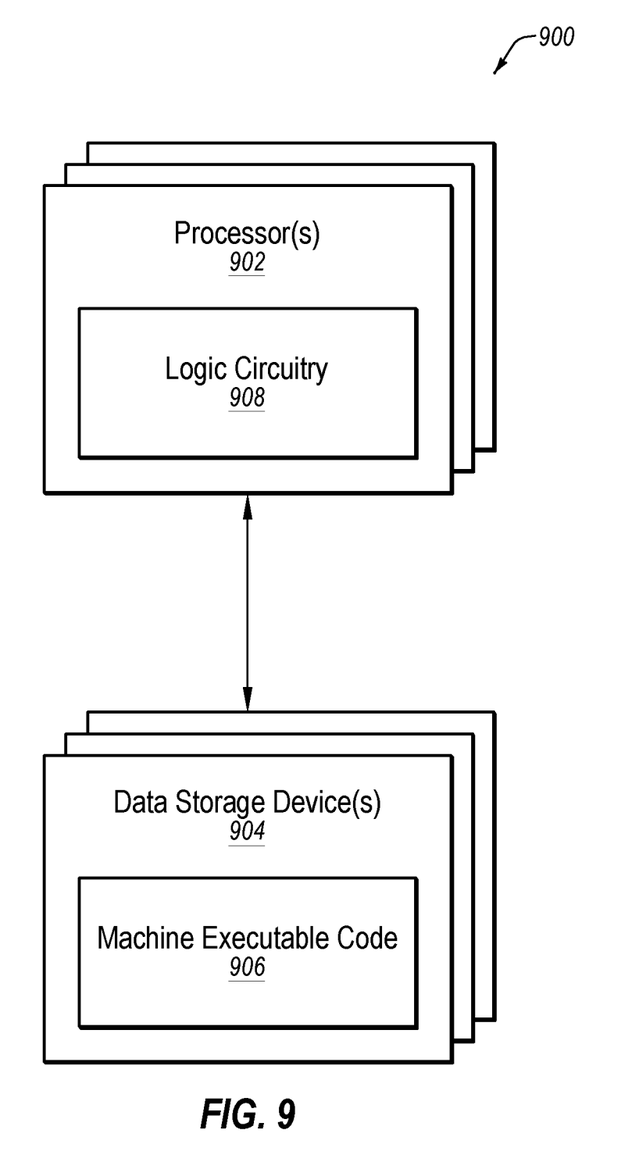
FIG. 9 illustrates a block diagram of circuitry that may be used to implement various functions, operations, acts, processes, or methods, in accordance with one or more examples.

FIG. 9 is a block diagram of circuitry 900 that, in some examples, may be used to implement various functions, operations, acts, processes, or methods disclosed herein. The circuitry 900 includes one or more processors 902 (sometimes referred to herein as "processors 902") operably coupled to one or more apparatuses such as data storage devices (sometimes referred to herein as "storage 904"), without limitation. The storage 904 includes machine executable code 906 stored thereon (e.g., stored on a computer-readable memory, without limitation) and the processors 902 include logic circuitry 908. The machine executable code 906 include information describing functional elements that may be implemented by (e.g., performed by) the logic circuitry 908. The logic circuitry 908 is adapted to implement (e.g., perform) the functional elements described by the machine executable code 906. The circuitry 900, when executing the functional elements described by the machine executable code 906, should be considered as special purpose hardware configured for carrying out functional elements disclosed herein. In some examples the processors 902 may be configured to perform the functional elements described by the machine executable code 906 sequentially, concurrently (e.g., on one or more different hardware platforms, without limitation), or in one or more parallel process streams.

When implemented by logic circuitry 908 of the processors 902, the machine executable code 906 is configured to adapt the processors 902 to perform operations of examples disclosed herein. For example, the machine executable code 906 may be configured to adapt the processors 902 to perform at least a portion or a totality of the operations discussed for system 100 of FIG. 1, FIG. 2, or FIG. 3, and more specifically, one or more of the controller 102 or aggregator/disaggregator 106 of FIG. 1, FIG. 2, and FIG. 3, disaggregator 506 of FIG. 5, aggregator 406, of FIG. 4, switch 600 of FIG. 6, or aggregator/disaggregator 624 of FIG. 6 (including frame receiver 608, (which frame receiver 608 includes addresser 610 and validity checker 612)) and frame generator 614, (which frame generator 614 includes addresser 616 and validity-information adder 618), without limitation.

The processors 902 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute computing instructions (e.g., software code, without limitation) related to examples of the present disclosure. It is noted that a general-purpose processor (may also be referred to herein as a host processor or simply a host) may be a microprocessor, but in the alternative, the processors 902 may include any conventional processor, controller, microcontroller, or state machine. The processors 902 may also be implemented as a combination of computing devices, such as a combination of a DSP and a microprocessor, a plurality of microprocessors, one or more microprocessors in conjunction with a DSP core, or any other such configuration.

In some examples the storage 904 includes volatile data storage (e.g., random-access memory (RAM), without limitation), non-volatile data storage (e.g., Flash memory, a hard disc drive, a solid state drive, erasable programmable read-only memory (EPROM), without limitation). In some examples the processors 902 and the storage 904 may be implemented into a single device (e.g., a semiconductor device product, a system on chip (SOC), without limitation). In some examples the processors 902 and the storage 904 may be implemented into separate devices.

In some examples the machine executable code 906 may include computer-readable instructions (e.g., software code, firmware code, without limitation). By way of non-limiting example, the computer-readable instructions may be stored by the storage 904, accessed directly by the processors 902, and executed by the processors 902 using at least the logic circuitry 908. Also by way of non-limiting example, the computer-readable instructions may be stored on the storage 904, transmitted to a memory device (not shown) for execution, and executed by the processors 902 using at least the logic circuitry 908. Accordingly, in some examples the logic circuitry 908 includes electrically configurable logic circuitry 908.

In some examples the machine executable code 906 may describe hardware (e.g., circuitry, without limitation) to be implemented in the logic circuitry 908 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, VERILOG™, SYSTEMVERILOG™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 908 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine executable code 906 may include an HDL, an RTL, a GL description, a mask level description, other hardware description, or any combination thereof.

In examples where the machine executable code 906 includes a hardware description (at any level of abstraction), a system (not shown, but including the storage 904) may be configured to implement the hardware description described by the machine executable code 906. By way of non-limiting example, the processors 902 may include a programmable logic device (e.g., an FPGA or a PLC, without limitation) and the logic circuitry 908 may be electrically controlled to implement circuitry corresponding to the hardware description into the logic circuitry 908. Also by way of non-limiting example, the logic circuitry 908 may include hard-wired logic manufactured by a manufacturing system (not shown, but including the storage 904) according to the hardware description of the machine executable code 906.

Regardless of whether the machine executable code 906 includes computer-readable instructions or a hardware description, the logic circuitry 908 is adapted to perform the functional elements described by the machine executable code 906 when implementing the functional elements of the machine executable code 906. It is noted that although a hardware description may not directly describe functional elements, a hardware description indirectly describes functional elements that the hardware elements described by the hardware description are capable of performing.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

Additional non-limiting examples of the disclosure include:

Example 1: An apparatus comprising: a network-facing interface to receive a control frame; multiple device-facing interfaces to respectively communicate with multiple devices; and a disaggregator arranged between the network-facing interface and the multiple device-facing interfaces to generate a plurality of control frames responsive to the received control frame, a respective one of the plurality of generated control frames comprising an address of a respective one of the multiple devices and a datum processed from data of the received control frame.

Example 2: The apparatus according to Example 1, wherein the plurality of generated control frames are Ethernet frames and wherein the received control frame is an Ethernet frame.

Example 3: The apparatus according to any of Examples 1 and 2, wherein the disaggregator is a functional portion of an aggregator/disaggregator, which aggregator/disaggregator to generate a data frame responsive to a plurality of data frames received from the multiple devices, the generated data frame comprising a respective sense datum processed from each of the plurality of received data frames.

Example 4: An apparatus comprising: a network-facing interface; multiple device-facing interfaces to respectively communicate with multiple devices; and an aggregator arranged between the network-facing interface and the multiple device-facing interfaces to generate a data frame responsive to a plurality of data frames received from the multiple devices, the generated data frame comprising a respective datum processed from each of the plurality of received data frames.

Example 5: The apparatus according to Example 4, wherein the aggregator comprises a data storage and a timer and wherein the aggregator stores the respective datum of the plurality of received data frames at the data storage for a time duration indicated by the timer before generating the data frame.

Example 6: The apparatus according to any of Examples 4 and 5, wherein the plurality of received data frames are Ethernet frames and wherein the generated data frame is an Ethernet frame.

Example 7: The apparatus according to any of Examples 4 through 6, wherein the aggregator is a functional portion of an aggregator/disaggregator, the aggregator/disaggregator to generate a plurality of control frames responsive to a received control frame, a respective one of the plurality of generated control frames comprising an address of a respective one of the multiple devices and a control datum processed from control data of the received control frame.

Example 8: A method comprising: generating a plurality of control frames responsive to a received control frame, a respective one of the plurality of generated control frames comprising a respective address of a respective device, the respective one of the plurality of generated control frames comprising a respective datum processed from data of the received control frame.

Example 9: The method according to Example 8, comprising parsing the data of the received control frame into the respective datum of the plurality of generated control frames.

Example 10: The method according to any of Examples 8 and 9, comprising addressing the respective one of the plurality of generated control frames to the respective device.

Example 11: The method according to any of Examples 8 through 10, comprising generating a respective header for the respective one of the plurality of generated control frames.

Example 12: The method according to any of Examples 8 through 11, comprising generating a data frame responsive to a plurality of data frames received from a respective plurality of devices, the generated data frame comprising a respective sense datum processed from each of the plurality of received data frames.

Example 13: A method comprising: generating a data frame responsive to a plurality of data frames received from a respective plurality of devices, the generated data frame comprising a respective datum processed from each of the plurality of received data frames.

Example 14: The method according to Example 13, comprising collating the respective data of the plurality of received data frames into the generated data frame.

Example 15: The method according to any of Examples 13 and 14, comprising ordering the respective data of the plurality of received data frames in the generated data frame according to a pre-specified order.

Example 16: The method according to any of Examples 13 through 15, comprising generating a header for the generated data frame at least partially responsive to respective headers of the plurality of received data frames.

Example 17: The method according to any of Examples 13 through 16, wherein the generated header includes information indicative of an order of the respective data from the plurality of received data frames in the generated data frame.

Example 18: The method according to any of Examples 13 through 17, comprising generating a plurality of control frames responsive to a received control frame, a respective one of the plurality of generated control frames comprising a respective address of a respective one of the plurality of devices, the respective one of the plurality of generated control frames comprising a respective control datum processed from control data of the received control frame.

What is claimed is:
1. An apparatus comprising:
   multiple device-facing interfaces to respectively communicate with multiple devices;
   a network-facing interface to receive an Ethernet control frame from a controller, the control frame including a data block and an instruction to direct operations of respective ones of the multiple devices via the Ethernet control frame; and
   an aggregator/disaggregator device for Ethernet frames arranged between the network-facing interface and the multiple device-facing interfaces, wherein the aggregator/disaggregator device to:
   process the data block of the received Ethernet control frame to extract one or more datums,
   a datum of the one or more datums corresponding to data of a respective one of the multiple devices; and
   generate a number of new control frames responsive to the received Ethernet control frame, a respective one of the number of new Ethernet control frames comprising a header and a corresponding datum of a respective one of the multiple devices.

2. The apparatus of claim 1, wherein the multiple devices comprise one or more of sensors or actuators.

3. The apparatus of claim 1, wherein the aggregator/disaggregator device to generate a new Ethernet data frame responsive to a number of Ethernet data frames received from the multiple devices, the new Ethernet data frame comprising a respective sense datum processed from a respective one of the number of Ethernet data frames received from the multiple devices.

4. An apparatus comprising:
   a network-facing interface;
   multiple device-facing interfaces to receive through an Ethernet network data frames from multiple devices that send readings via the data frames; and
   an aggregator/disaggregator device arranged between the network-facing interface and the multiple device-facing interfaces wherein the aggregator/disaggregator device to:
   process a respective one of a plurality of received data frames to generate a respective datum, the respective datum comprising a reading of a respective one of the multiple devices; and
   generate a new Ethernet data frame responsive to the plurality of data frames received through the Ethernet network from the multiple devices, the generated new Ethernet data frame comprising the respective datum comprising the reading of a respective one of the multiple devices.

5. The apparatus of claim 4, wherein the aggregator/disaggregator device comprises a data storage and a timer and wherein the aggregator/disaggregator device stores the respective datum of the plurality of received data frames at the data storage for a time duration indicated by the timer before generating the new Ethernet data frame.

6. The apparatus of claim 4, wherein the multiple devices are one or more actuators of a control system.

7. The apparatus of claim 6, wherein the aggregator/disaggregator device to generate a number of new control frames responsive to a received control frame, a respective one of the number of generated new control frames comprising an address of a respective one of the multiple devices and a control datum processed from control data of the received control frame.

8. A method comprising:
receiving a control frame from a controller of an Ethernet network including data and instructions directing operations of a number of devices;
processing the data of the received control frame to extract a respective datum, the respective extracted datum corresponding to a respective device of the number of devices; and
generating a plurality of new control frames responsive to the received control frame, a respective one of the plurality of new control frames comprising an address and a datum of a respective device.

9. The method of claim 8, comprising parsing the data of the received control frame into the respective datum of the plurality of new control frames.

10. The method of claim 8, comprising addressing the respective one of the plurality of new control frames to the respective device.

11. The method of claim 8, comprising generating a respective header for the respective one of the plurality of new control frames.

12. The method of claim 8, comprising generating a new Ethernet data frame responsive to a plurality of data frames received from a respective plurality of devices, the generated new Ethernet data frame comprising a respective sense datum processed from a respective one of the plurality of received data frames.

13. A method comprising:
receiving a plurality of Ethernet data frames from a respective plurality of devices sending readings of the respective plurality of devices;
processing, by an aggregator/disaggregator device, a respective one of a plurality of received data frames from the respective plurality of devices to extract a respective datum, the respective extracted datum comprising a reading of a respective one of the respective plurality of devices; and
generating a new data frame responsive to the plurality of data frames received from a respective plurality of devices, the generated data frame comprising the respective datum comprising a reading of a respective one of the respective plurality of devices.

14. The method of claim 13, comprising collating the respective data of the plurality of received data frames into the generated new data frame.

15. The method of claim 13, comprising ordering the respective data of the plurality of received data frames in the generated data frame according to a pre-specified order.

16. The method of claim 13, comprising generating a header for the generated new data frame at least partially responsive to respective headers of the plurality of received data frames.

17. The method of claim 16, wherein the generated header includes information indicative of an order of the respective data from the plurality of received data frames in the generated data frame.

18. The method of claim 13, comprising generating a plurality of control frames responsive to a received control frame, a respective one of the plurality of generated control frames comprising a respective address of a respective one of the plurality of devices, the respective one of the plurality of generated control frames comprising a respective control datum processed from control data of the received control frame.

19. A system for network communication, comprising:
multiple devices that send readings through an Ethernet network via data frames;
a control device that sends instructions to direct operation of the multiple devices via control frames;
a network switching device comprising:
a network-facing interface to communicate with the control device;
multiple device-facing interfaces to respectively communicate with the multiple devices;
an aggregator/disaggregator device arranged between the network-facing interface and the multiple device-facing interfaces to:
process data of a control frame received through the Ethernet network from the control device to extract one or more datums, a datum of the one or more datums corresponding to data of a respective one of the multiple devices; and
generate a number of new Ethernet control frames responsive to the received control frame, a respective one of the number of new Ethernet control frames comprising a header and a corresponding extracted datum for a respective one of the multiple devices; and
wherein the aggregator/disaggregator to:
process a respective one of a number of data frames received through the Ethernet network to extract a respective datum, the respective extracted datum comprising a reading of data from a respective one of the multiple devices; and
generate a new Ethernet data frame responsive to the number of data frames received from the respective multiple devices, the new Ethernet data frame comprising a respective header and the respective extracted datum.

* * * * *